(12) United States Patent
Sato et al.

(10) Patent No.: US 8,371,973 B2
(45) Date of Patent: *Feb. 12, 2013

(54) CHAIN TENSIONER

(75) Inventors: Seiji Sato, Iwata (JP); Tasuku Furukawa, Iwata (JP)

(73) Assignee: NTN Corporation, Osaka (JP)

( * ) Notice: Subject to any disclaimer, the term of this patent is extended or adjusted under 35 U.S.C. 154(b) by 187 days.

This patent is subject to a terminal disclaimer.

(21) Appl. No.: 12/738,100

(22) PCT Filed: Nov. 5, 2008

(86) PCT No.: PCT/JP2008/070093
§ 371 (c)(1),
(2), (4) Date: Apr. 15, 2010

(87) PCT Pub. No.: WO2009/060848
PCT Pub. Date: May 14, 2009

(65) Prior Publication Data
US 2010/0222168 A1  Sep. 2, 2010

(30) Foreign Application Priority Data

Nov. 9, 2007 (JP) ................................. 2007-291711

(51) Int. Cl.
*F16H 7/08* (2006.01)
*F16H 7/18* (2006.01)
(52) U.S. Cl. ........ 474/101; 474/109; 474/110; 474/111; 474/140
(58) Field of Classification Search .................. 474/109, 474/110, 111, 101, 140
See application file for complete search history.

(56) References Cited

U.S. PATENT DOCUMENTS
(Continued)

FOREIGN PATENT DOCUMENTS
| JP | 10-019095 | 1/1998 |
| JP | 10-122315 | 5/1998 |

(Continued)

OTHER PUBLICATIONS

JP2001124159A English Translation.*

(Continued)

*Primary Examiner* — Sang Kim
*Assistant Examiner* — Minh Truong
(74) *Attorney, Agent, or Firm* — Wenderoth, Lind & Ponack, L.L.P.

(57) ABSTRACT

A chain tensioner includes a cylindrical cylinder having an open end and a bottom, a cylindrical plunger axially slidably inserted in the cylinder and having a bottom and an open end located in the cylinder, a screw rod mounted in the cylinder and having an external thread on an outer periphery thereof, wherein the plunger has a protrusion on an inner periphery thereof which is in threaded engagement with the external thread of the screw rod, and wherein the external thread has a pressure flank for receiving pressure when a force is applied that tends to push the plunger into the cylinder, and a clearance flank, the pressure flank having a larger flank angle than the clearance flank, whereby the external thread is serration-shaped, and a return spring mounted between the plunger and the screw rod and biasing the plunger in a direction to protrude from the cylinder, thereby pressing a chain with the plunger, wherein the protrusion extends only a limited arcuate range of the inner periphery of the plunger.

15 Claims, 4 Drawing Sheets

U.S. PATENT DOCUMENTS

| | | | |
|---|---|---|---|
| 4,702,726 A * | 10/1987 | Ojima et al. | 474/101 |
| 4,722,720 A * | 2/1988 | Ojima et al. | 474/101 |
| 5,383,813 A * | 1/1995 | Odai | 474/110 |
| 5,713,809 A | 2/1998 | Yamamoto et al. | |
| 5,879,255 A * | 3/1999 | Yamamoto et al. | 474/110 |
| 5,961,410 A | 10/1999 | Yamamoto | |
| 6,450,908 B2 * | 9/2002 | Ishii et al. | 474/138 |
| 6,685,587 B2 * | 2/2004 | Rossato et al. | 474/109 |
| 7,559,863 B2 * | 7/2009 | Onimaru et al. | 474/110 |
| 2001/0041635 A1 | 11/2001 | Ishii et al. | |
| 2003/0186764 A1 * | 10/2003 | Yoshida et al. | 474/109 |
| 2008/0280712 A1 * | 11/2008 | Ryouno et al. | 474/110 |
| 2009/0011880 A1 * | 1/2009 | Sato et al. | 474/111 |
| 2010/0099529 A1 * | 4/2010 | Sato et al. | 474/110 |

FOREIGN PATENT DOCUMENTS

| | | |
|---|---|---|
| JP | 2001-124159 | 5/2001 |
| WO | 00/32961 | 6/2000 |

OTHER PUBLICATIONS

International Search Report issued Dec. 2, 2008 in International (PCT) Application No. PCT/JP2008/070093.

* cited by examiner

CHAIN TENSIONER

BACKGROUND OF THE INVENTION

I. Technical Field

This invention relates to a chain tensioner used to maintain the tension of a timing chain for driving a camshaft of an automotive engine.

II. Description of the Related Art

In an automotive engine, the rotation of the crankshaft is ordinarily transmitted to a camshaft through a timing chain to open and close valves of combustion chambers with the rotation of the camshaft. In order to keep the tension of the chain within an optimum range, a tension adjusting assembly is often used which comprises a chain guide pivotable about a pivot shaft and chain tensioner for pressing the chain guide against the chain.

One known chain tensioner forming such a tension adjusting assembly comprises a cylindrical cylinder having an open end and a bottom, a cylindrical plunger axially slidably inserted in the cylinder and having a bottom and an open end located in the cylinder, a screw rod mounted in the cylinder and having an external thread on an outer periphery thereof, wherein the plunger has an internal thread on an inner periphery thereof which is in threaded engagement with the external thread of the screw rod, and wherein the external thread and the internal thread each have a pressure flank for receiving pressure when a force is applied that tends to push the plunger into the cylinder, and a clearance flank, the pressure flank having a larger flank angle than the clearance flank, whereby the external thread and the internal thread are serration-shaped, and a return spring mounted between the plunger and the screw rod and biasing the plunger in a direction to protrude from the cylinder, thereby pressing the chain with the plunger (JP patent publication 10-19095A).

With this chain tensioner, when the tension of the chain increases while the engine is running, the plunger is pushed into the cylinder under the tension of the chain, thereby absorbing the tension of the chain. At this time, the vibration of the chain allows the screw rod to rotate relative to the plunger while repeatedly moving back and forth within the range of the clearance between the internal and external threads.

When the tension of the chain decreases while the engine is running, the plunger protrudes from the cylinder under the biasing force of the return spring, thereby eliminating slackness of the chain.

When the engine is stopped, the tension of the chain may remain high according to the stop position of the camshaft. In this state, since the chain does not vibrate, the internal thread of the plunger is supported by the external threads of the screw rod, so that the plunger is kept in a stationary position. Thus, when the engine is restarted, the chain is less likely to slacken, thus allowing smooth startup of the engine.

SUMMARY OF THE INVENTION

With this chain tensioner, since the plunger is a cylindrical member having a bottom, when forming the internal thread on its inner periphery with a tap, it is necessary to keep the tip of the tap from interfering with the bottom of the plunger. This makes it difficult to ensure sufficient biting length of the tap, thus making machining of the plunger difficult.

An object of the present invention is to provide a chain tensioner of which the plunger can be machined more easily.

Means to Achieve the Object

In order to achieve this object, a protrusion formed on the inner periphery of the plunger extends only a limited arcuate range of the inner periphery of the plunger.

The protrusion may be a thread having a serration-shaped section and having a lead angle corresponding to the external thread of the screw rod, may be a circumferentially extending protrusion having a serration-shaped section, or may be a protrusion formed by recessing an open end face of the plunger.

If multiple external threads are provided instead of the single external thread, there are provided as many of the protrusions as the multiple external threads. The plunger may comprise a cylindrical member having the protrusion or protrusions on an inner periphery thereof and having openings at both ends, and a cap member fitted in one end of the cylindrical member. In this case, the cap member may be press-fitted into and fixed to the cylindrical member, or may be welded and fixed to the cylindrical member.

With the chain tensioner according to the present invention, since the protrusion extends only a limited arcuate range of the inner periphery of the plunger, its circumferential length is smaller than that of a protrusion extending the entire circumference of the inner periphery of the plunger. Thus, the plunger can be easily machined. Also, this chain tensioner is more lightweight than a tensioner in which the protrusion extends the entire circumference of the inner periphery of the plunger.

DETAILED DESCRIPTION OF THE INVENTION

Figure 1:
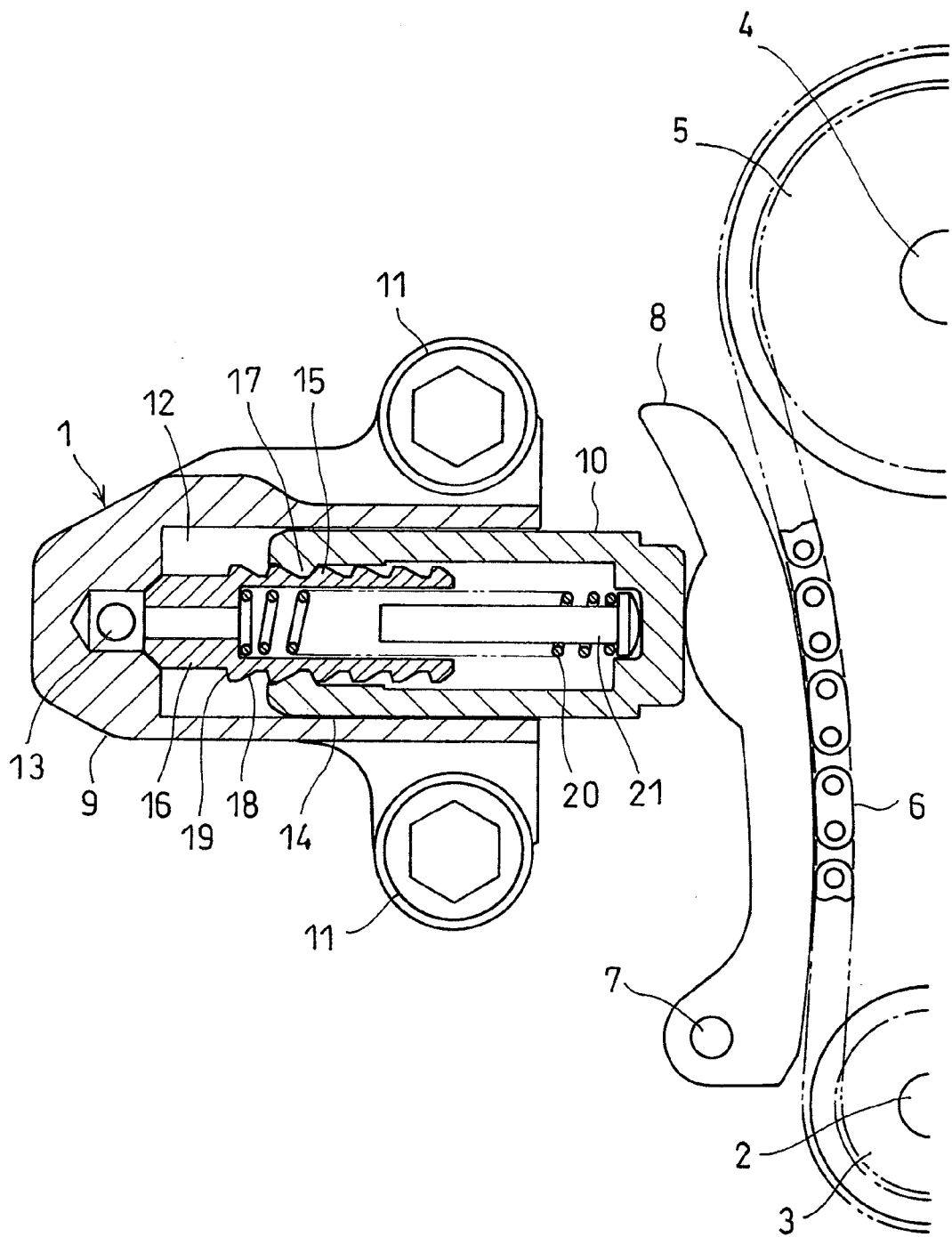
FIG. 1 is a partially sectional front view of a chain transmission assembly including a chain tensioner embodying the present invention.

FIG. 1 shows a chain transmission assembly including a chain tensioner 1 embodying the present invention. The chain transmission assembly includes a sprocket 3 fixed to an engine crankshaft 2, a sprocket 5 fixed to a camshaft 4, and a chain 6 coupling the sprockets 3 and 5 together. Thus, the chain 6 transmits the rotation of the crankshaft 2 to the camshaft 4, thereby opening and closing valves (not shown) for combustion chambers as the camshaft 4 rotates.

A chain guide 8 pivotable about a pivot shaft 7 is in contact with the chain 6, and is pressed against the chain 6 by the chain tensioner 1.

The chain tensioner 1 includes a cylindrical cylinder 9 having an open end and a bottom, and a plunger 10 axially slidably inserted in the cylinder 9. The cylinder 9 is fixed to an engine block (not shown) by bolts 11.

The cylinder 9 is formed with an oil supply passage 13 communicating with a pressure chamber 12 defined by the cylinder 9 and the plunger 10. The oil supply passage 13 is connected to an oil supply pump (not shown) so that hydraulic oil from the oil supply pump is introduced into the chamber 12 through the oil supply passage 13.

A very small leakage gap 14 is defined between sliding surfaces of the plunger 10 and the cylinder 9 through which hydraulic oil in the pressure chamber 12 leaks.

A screw rod 16 having double external threads 15 on its outer periphery is received in the cylinder 9. The plunger 10 has a bottom end and an open end which is located in the cylinder 9 and is formed with two protrusions 17 on its inner periphery that are in threaded engagement with the external threads 15 on the screw rod 16.

The external threads 15 have an asymmetrical serration-shaped section taken along a plane including the axis, with their pressure flanks 18 that receive pressure when force is applied that tends to push the plunger 10 into the cylinder 9 having a larger flank angle than their clearance flanks 19.

Figure 2:
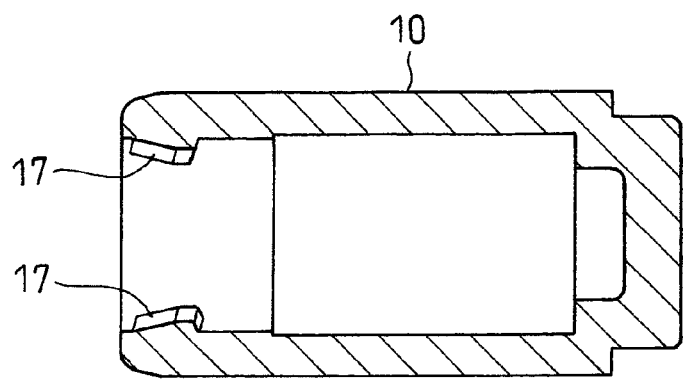
FIG. 2 is a sectional front view of a plunger shown in FIG. 1.
Figure 3:
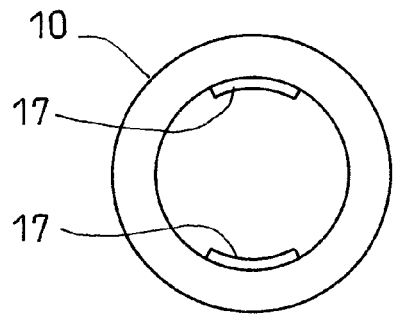
FIG. 3 is a left-hand side view of the plunger shown in FIG. 2.

As shown in FIG. 2, the protrusions 17 have a serration-shaped section and have a lead angle corresponding to that of the external threads 15. As shown in FIG. 3, the two protrusions 17 are arcuate portions circumferentially spaced from each other on the inner periphery of the plunger 10.

As shown in FIG. 1, a return spring 20 is mounted between the plunger 10 and the screw rod 16. The return spring 20 has one end thereof supported by the screw rod 16 and the other end pressed against the plunger 10 through a spring seat 21, thereby pressing the plunger 10 in the direction to protrude from the cylinder 9.

Now the operation of the chain tensioner 1 is described.

When the tension of the chain decreases while the engine is running, the plunger 10 protrudes from the cylinder under the biasing force of the return spring 20, thereby removing slackness of the chain 6. At this time, hydraulic oil is supplied into the pressure chamber 12 through the oil supply passage 13.

When the tension of the chain 6 increases while the engine is running, the plunger 10 is pushed into the cylinder under the tension of the chain 6. In this state, due to vibration of the chain 6, the screw rod 16 rotates relative to the plunger 10 under the biasing force of the return spring 20, while repeatedly moving back and forth within the range of the axial gap between the external threads 15 and the protrusions 17.

When the engine is stopped, the tension of the chain 6 may remain high according to the stop position of the camshaft 4. In this state, since the chain 6 does not vibrate, the protrusions 17 on the inner periphery of the plunger 10 are supported by the pressure flanks 18 of the external threads 15 of the screw rod 16, so that the plunger 10 is kept in a stationary position. Thus, when the engine is restarted, the chain 6 is less likely to slacken, thus allowing a smooth startup of the engine.

With this chain tensioner 1, since the protrusions 17 each extend only a limited arcuate range of the inner periphery of the plunger 10, such protrusions 17 can be formed by tapping with lesser cutting resistance than a thread extending the entire circumference of the inner periphery of the plunger 10. Thus, the plunger 10 can be formed more easily. Also, this chain tensioner 1 is more lightweight than a tensioner in which a thread extends the entire circumference of the inner periphery of the plunger 10.

Figure 4:
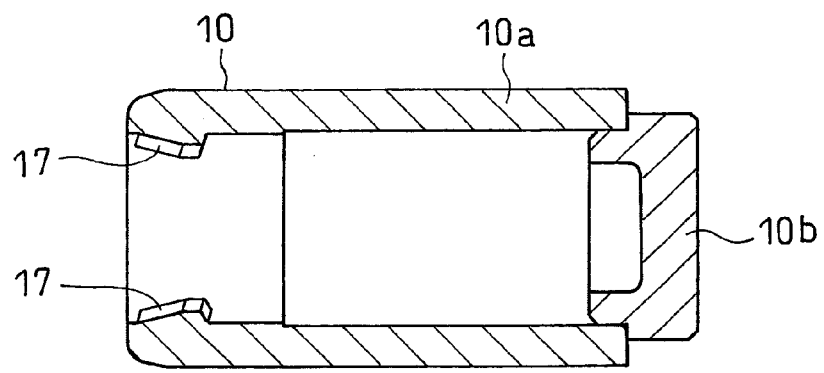
FIG. 4 is a sectional view of a modification of the plunger shown in FIG. 2 which comprises a cylindrical member and a cap member.
Figure 5:
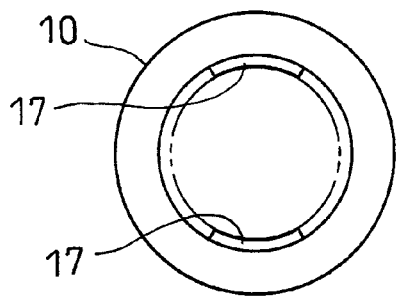
FIG. 5 is a left-hand side view of the plunger shown in FIG. 4.

As shown in FIGS. 4 and 5, the plunger 10 may comprise a cylindrical member 10a having the protrusions 17 on its inner periphery and having openings at both ends, and a cap member 10b fitted in one end of the cylindrical member 10a. With this arrangement, since the cylindrical member 10a has a tubular shape having openings at both ends, the protrusions 17 can be formed using a tap having a long biting length. In this case, the cap member 10b may be fixed to the cylindrical member 10a by press-fitting the former into the latter or by welding the former to the latter.

In the above embodiment, since the double external threads 15 are provided, two protrusions 17 corresponding to the respective external threads 15 are formed on the inner periphery of the plunger 10. If triple external threads are formed on the screw rod, three protrusions corresponding to the respective triple external threads are formed on the inner periphery of the plunger 10.

Figure 6:
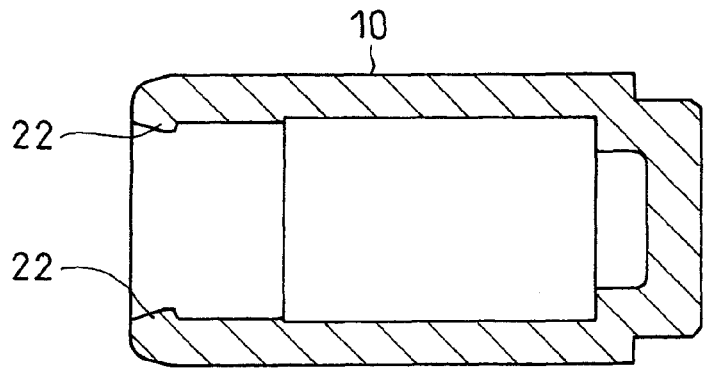
FIG. 6 is a sectional view of a modified plunger in which the protrusions shown in FIG. 2 are replaced by circumferentially extending protrusions having a serration-shaped section.
Figure 7:
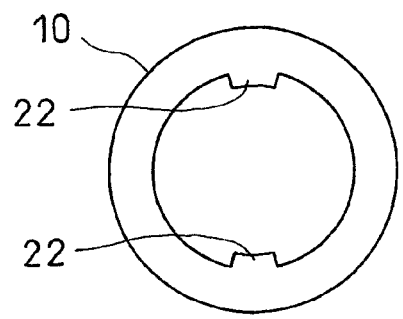
FIG. 7 is a left-hand side view of the plunger shown in FIG. 6.
Figure 8:
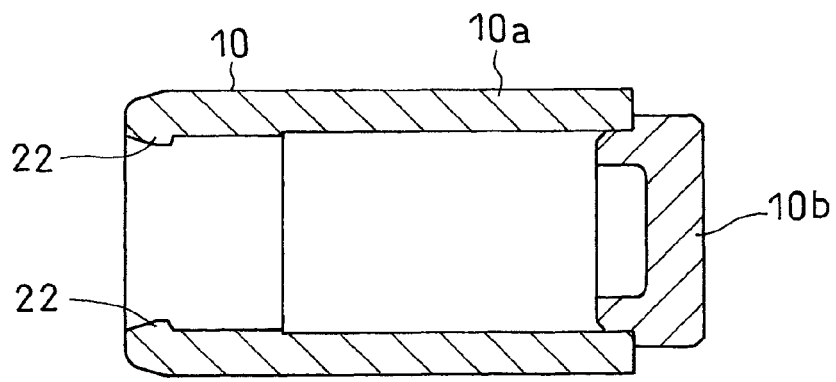
FIG. 8 is a modification of the plunger shown in FIG. 6 which comprises a cylindrical member and a cap member.
Figure 9:
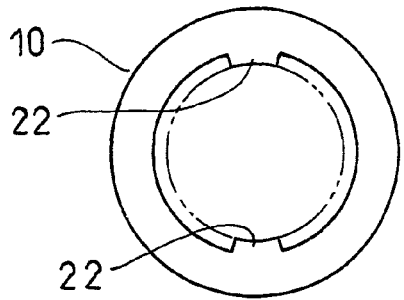
FIG. 9 is a left-hand side view of the plunger shown in FIG. 8.

In the above embodiment, the protrusions to be brought into threaded engagement with the external threads 15 are threads having a lead angle corresponding to the external threads 15 on the screw rod 16 and having a serration-shaped section. But instead, protrusions 22 may be formed having a serration-shaped section and extending circumferentially as shown in FIG. 6 only a limited arcuate range as shown in FIG. 7. With this arrangement too, the range by which the protrusions 22 extend is small compared to a protrusion extending the entire circumference of the inner periphery of the plunger 10, so that the plunger 10 can be formed easily. Further, as shown in FIGS. 8 and 9, the plunger 10 may comprise a cylindrical member 10a having the protrusions 22 on the inner periphery thereof and having openings at both ends, and a cap member 10b fitted in one end of the cylindrical member 10. With this arrangement, the protrusions 22 can be formed more easily.

Figure 10:
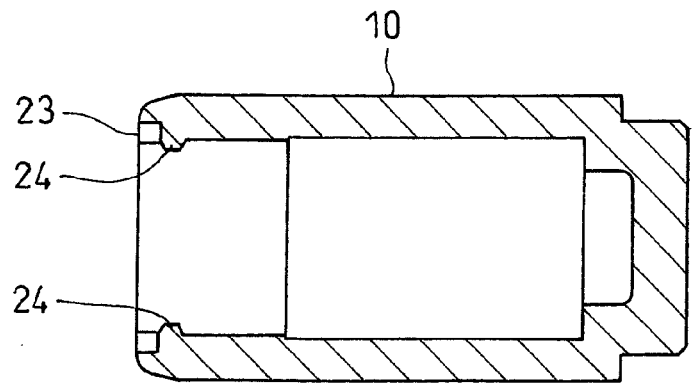
FIG. 10 is a sectional view of a modified plunger in which the protrusions shown in FIG. 2 are replaced by protrusions formed by recessing an open end face of the plunger.
Figure 11:
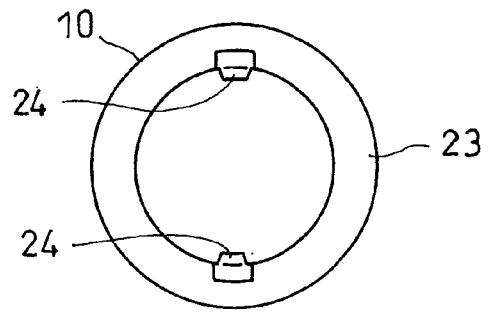
FIG. 11 is a left-hand side view of the plunger shown in FIG. 10.
Figure 12:
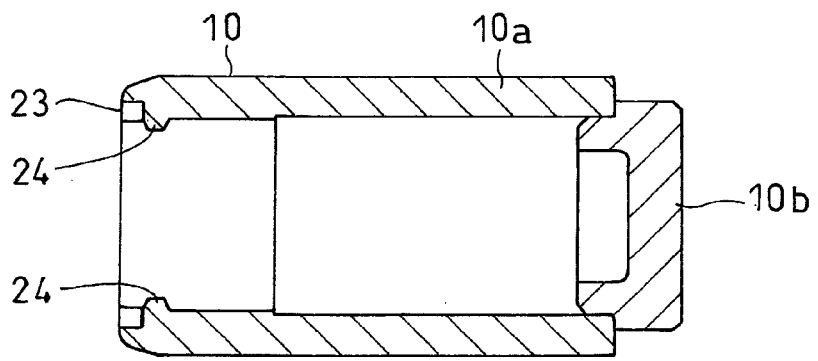
FIG. 12 is a sectional view of a modification of the plunger shown in FIG. 10 which comprises a cylindrical member and a cap member.
Figure 13:
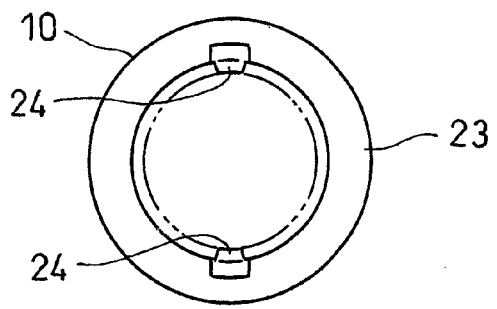
FIG. 13 is a left-hand side view of the plunger shown in FIG. 12.

As shown in FIG. 10, the protrusions to be brought into threaded engagement with the external threads 15 may be protrusions 24 formed by recessing the open end face 23 of the plunger 10. The protrusions 24 may be provided to extend only a limited arcuate range as shown in FIG. 11. Further, as shown in FIGS. 12 and 13, the plunger 10 may comprise a cylindrical member 10a having the protrusions 24 on the inner thereof and having openings at both ends, and a cap member 10b fitted in one end of the cylindrical member 10a.

What is claimed is:

1. A chain tensioner comprising:
a cylindrical cylinder having an open end and a bottom;
a cylindrical plunger axially slidably inserted in said cylinder, and having a bottom and an open end located in said cylinder; and
a screw rod mounted in said cylinder and having an external thread on an outer periphery thereof,
wherein said plunger has a protrusion on an inner periphery thereof which is in threaded engagement with said external thread of said screw rod,
wherein said external thread has a pressure flank configured to receive pressure when a force is applied that pushes said plunger into said cylinder, and a clearance flank, said pressure flank having a larger flank angle than said clearance flank, whereby said external thread is serration-shaped, and a return spring mounted between said plunger and said screw rod and biasing said plunger in a direction to protrude from said cylinder, thereby pressing a chain with said plunger, and wherein said protrusion extends circumferentially less than an entire circumference of said inner periphery of said plunger.

2. The chain tensioner of claim 1 wherein said protrusion is a thread having a serration-shaped section and having a lead angle corresponding to said external thread of said screw rod.

3. The chain tensioner of claim 2 wherein said external thread is one of a plurality of the external threads, said protrusion is one of a plurality of protrusions, and there are as many of said protrusions as said external threads.

4. The chain tensioner of claim 2 wherein said plunger comprises a cylindrical member having said protrusion on an inner periphery thereof and having openings at both ends, and a cap member fitted in one end of said cylindrical member.

5. The chain tensioner of claim 1 wherein said protrusion is a circumferentially extending protrusion having a serration-shaped section.

6. The chain tensioner of claim 5 wherein said external thread is one of a plurality of the external threads, said protrusion is one of a plurality of protrusions, and there are as many of said protrusions as said external threads.

7. The chain tensioner of claim 5 wherein said plunger comprises a cylindrical member having said protrusion on an inner periphery thereof and having openings at both ends, and a cap member fitted in one end of said cylindrical member.

8. The chain tensioner of claim 1 wherein said protrusion is formed by recessing an open end face of said plunger.

9. The chain tensioner of claim 8 wherein said external thread is one of a plurality of the external threads, said protrusion is one of a plurality of protrusions, and there are as many of said protrusions as said external threads.

10. The chain tensioner of claim 8 wherein said plunger comprises a cylindrical member having said protrusion on an inner periphery thereof and having openings at both ends, and a cap member fitted in one end of said cylindrical member.

11. The chain tensioner of claim 1 wherein said external thread is one of a plurality of the external threads, said protrusion is one of a plurality of protrusions, and there are as many of said protrusions as said external threads.

12. The chain tensioner of claim 11 wherein said plunger comprises a cylindrical member having said protrusions on an inner periphery thereof and having openings at both ends, and a cap member fitted in one end of said cylindrical member.

13. The chain tensioner of claim 1 wherein said plunger comprises a cylindrical member having said protrusion on an inner periphery thereof and having openings at both ends, and a cap member fitted in one end of said cylindrical member.

14. The chain tensioner of claim 13 wherein said cap member is press-fitted into and fixed to said cylindrical member.

15. The chain tensioner of claim 13 wherein said cap member is welded and fixed to said cylindrical member.

* * * * *